Jan. 16, 1951 M. H. ARMS 2,538,289
DIAPHRAGM CHUCK
Filed March 17, 1947

Inventor
Merton H. Arms
by
Wright Brown Quinby & Hay
Att'ys

Patented Jan. 16, 1951

2,538,289

UNITED STATES PATENT OFFICE 2,538,289

DIAPHRAGM CHUCK

Merton H. Arms, Springfield, Vt., assignor to Bryant Chucking Grinder Company, Springfield, Vt., a corporation of Vermont Application March 17, 1947, Serial No. 735,052

3 Claims. (Cl. 279—46)

This invention relates to chucks of the diaphragm type and has for an object to provide such a chuck which is not liable to release the work when rotated at a high speed due to the action of centrifugal force on the work-gripping parts of the chuck.

A further object of the invention is to provide a diaphragm chuck which has two sets of work grippers either of which may be rendered operative so that work pieces of widely different sizes or configurations may be held by the one chuck. For example, one of the sets of work grippers may engage a work piece externally and the other set may engage an internal face of a work piece. The particular set of work grippers not in operation at any time are employed to counterbalance the effects of centrifugal force on the work grippers which are in operation, or if desired to over balance.

For a complete understanding of this invention, reference may be had to the accompanying drawings in which Figure 1 is a front elevation of a chuck embodying the invention.

Figure 3:
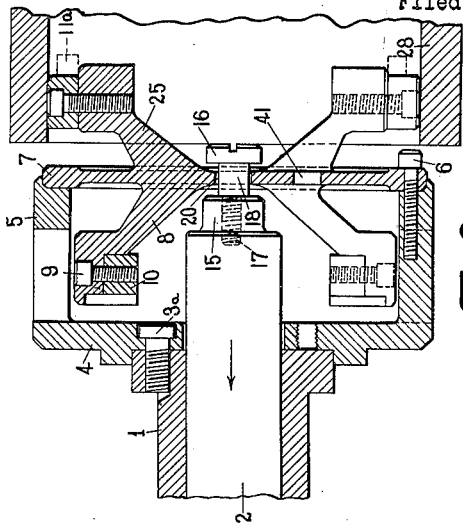
Figure 3 is a view similar to Figure 2, but showing the work-engaging diaphragm reversed and engaging the inner walls of a work piece.

At 1 is shown a rotary hollow work spindle through which is slidable a work-releasing rod 2. The spindle 1 has a nose 3 on its forward end to which may be attached the chuck. This chuck comprises a rear face plate portion 4 which may be secured to the nose 3, as by the screws 3a, this face plate portion having a forwardly projecting housing 5. To the forward edge of this housing there is secured, as by screws 6, a diaphragm 7. This diaphragm has a series of radial angularly spaced forwardly extending fingers 8 to the inner face of which may be adjustably secured, as by screws 9, a plurality of work-gripping segments 10. These segments may be held in work holding position for grinding their work-engaging faces by a ring 11, shown in dotted lines, the ring holding the segments slightly sprung open so that they grip the ring. This ring is thereafter removed and is not used during normal operation of the chuck. The elements 10 are of such thickness that the return of the diaphragm 7 toward normal unstressed condition causes them to engage and grip the outer face of the work piece 14.

Figure 2:
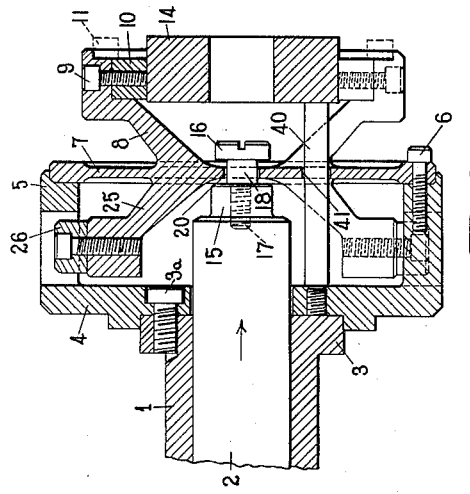
Figure 2 is a sectional view on line 2—2 of Figure 1 and showing an externally clamped work piece.

The rod 2 has a reduced extremity 15 to which is secured a head 16 having a threaded shank 17. A reduced diameter portion 18 of this head projects through an opening 20 centrally positioned through the diaphragm 7. By moving the rod 2 in the direction of the arrow shown in Figure 2, the mid-portion of the diaphragm is flexed outwardly, rocking the jaws 10 outwardly and freeing the work piece.

It will be noted, however, that centrifugal force acting on the jaws 8 and the blocks 10 would normally tend to separate the gripping blocks 10 and thus free the work therefrom when the work is rotated at a substantial speed. In order to prevent this the diaphragm 7 is provided with radially arranged fingers 25 which extend into the space between the diaphragm 7 and the face plate portion 4 afforded by the housing 5. Centrifugal force acting on these fingers 25 is in reverse direction to centrifugal force acting on the fingers 8 and this centrifugal force on the two sets of fingers may be substantially equalized, if desired or necessary, counterweights 26 being secured to the rearwardly extended fingers 25 for this purpose. Under such conditions rotation of the spindle will have no tendency to release the work.

This construction, however, has a further advantage in that it permits reversal end for end of the diaphragm 7 so that either set of fingers 8 or 25 may be arranged to grip the work and the other set to counterbalance the first set. Thus in Figure 3 the fingers 25 are positioned outwardly while the fingers 8 are the counterbalance fingers, and as shown in Figure 3, the fingers 25 may be provided with external segmental clamping blocks 27 which may be engaged with the inner wall of the work piece 28. If suitable, the counterbalance weights 26 of Figure 2 and the clamping bars 27 of Figure 3 may be the same elements. In order to release the work piece 28, the rod 2 is moved to the left so that the head portion 16 engages the diaphragm 7 and deflects it in the opposite direction to its action in Figure 2, flexing of the diaphragm in this direction, serving to move the clamping blocks 27 inwardly toward each other to free the work.

A ring 11a, shown in dotted lines in Figure 3, may be employed when grinding the work-engaging faces of the external segmental clamping blocks 27 to hold the fingers 25 slightly closed, this ring 11a being thereafter removed and not used during normal operation of the chuck.

Figure 5:
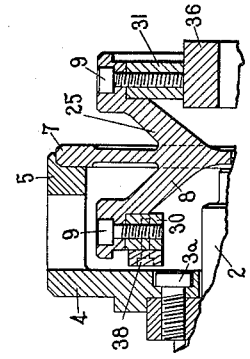
Figures 4 and 5 are fragmentary views similar to a portion of Figure 2, but showing work pieces of different size engaged by reverse positioning of the diaphragm.
Figure 4:
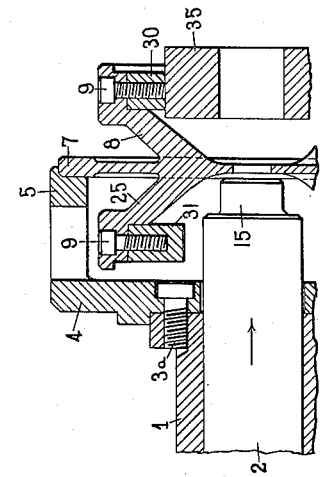
Figure 1:
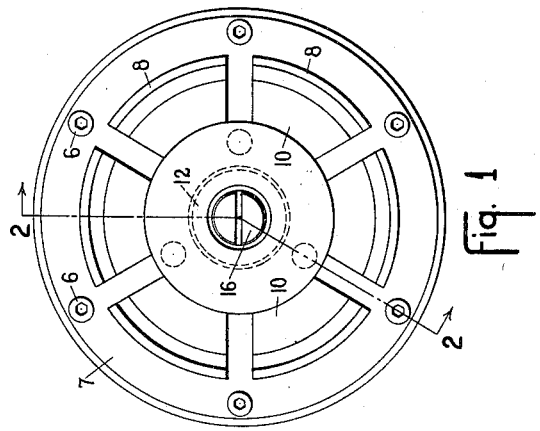

In Figures 4 and 5 each set of fingers 8 and 25 are employed when outwardly positioned, for engagement with the outer face of the work, but the effective internal diameters of the clamping blocks 30 and 31 may be different so that a relatively large diameter piece 35 may be gripped by the fingers 8 with their clamping blocks 30 as shown in Figure 5, and a relatively small diameter work piece such as 36, may be engaged by the blocks 31 when the fingers 25 are employed as the forwardly extending gripping elements. If desired the inner fingers may be weighted to overbalance the outer fingers so that centrifugal force increases the clamping pressure on the work during rotation. This may be accomplished, for example, by the use of weights 38 attached as by screws to the inner segments 30 of Figure 5. Where the work is to be engaged externally in all cases, it is not necessary to employ the head 16, as flexure of the diaphragm to release the work is then done by motion to the right of the release rod 2 which engages the central portion of the diaphragm and flexes it in the necessary direction, the inherent spring of the diaphragm returning it to clamping position as soon as the pressure of the rod 2 thereon is released. As is customary with diaphragm chucks, one or more stop bars 40 having their rear ends threaded into the face plate portion 4 and extending through a perforation 41 in the diaphragm, may be employed to limit the extent to which the work piece may be thrust backwardly between the clamping blocks, this being shown in Figure 2.

From the foregoing description of certain embodiments of this invention it will be understood by those skilled in the art that various further changes and modifications might be made without departing from its spirit or scope.

I claim:

1. A diaphragm chuck including a face plate for attachment to a spindle nose, a diaphragm, means supporting said diaphragm forwardly of and spaced from said face plate and either side out, a set of angularly spaced fingers extending outwardly from opposite faces of said diaphragm, the fingers of each set substantially counterbalancing the effects of centrifugal force on the fingers of the other set as the chuck is revolved about its axis, the fingers of each set when extended away from said face plate being positioned to engage a work piece, and means for flexing said diaphragm by pressure exerted axially substantially centrally thereon to retract such fingers from and free the work piece.

2. A diaphragm chuck including a face plate for attachment to a spindle nose, a diaphragm, means supporting said diaphragm forwardly of and spaced from said face plate and either side out, a set of angularly spaced fingers extending away from each of opposite faces of said diaphragm, the fingers of each set substantially counterbalancing the effects of centrifugal force on the fingers of the other set tending to flex said diaphragm as the chuck is revolved about its axis, the fingers of each set when extended away from said face plate being positioned to engage a work piece, the fingers of one set having inwardly facing work-engaging portions to engage an external face of a work piece and the fingers of the other set having outwardly facing work-engaging portions arranged to engage an internal face of a work piece, and means for flexing said diaphragm by pressure exerted axially substantially centrally thereon to retract such fingers from and free the work piece.

3. A diaphragm chuck including a face plate for attachment to a spindle nose, a diaphragm, means supporting said diaphragm forwardly of and spaced from said face plate and with either side facing outwardly, a set of angularly spaced fingers extending outwardly from each of opposite faces of said diaphragm, the fingers of each set substantially counterbalancing the effects of centrifugal force on the fingers of the other set as the chuck is revolved about its axis, the fingers of the two sets having their outer portions arranged normally spaced apart by different distances to engage work faces of different diameters and the fingers of each set when extended away from said face plate being positioned to engage a work piece, and means for flexing said diaphragm by pressure exerted axially substantially centrally thereon to retract such fingers from and free the work piece.

MERTON H. ARMS.

REFERENCES CITED

The following references are of record in the file of this patent:

UNITED STATES PATENTS

| Number | Name | Date |
|---|---|---|
| 1,956,272 | Church | Apr. 24, 1934 |
| 2,403,599 | Howart et al. | July 9, 1946 |

FOREIGN PATENTS

| Number | Country | Date |
|---|---|---|
| 474,962 | Great Britain | of 1937 |